May 3, 1927.  W. E. INGHAM  1,626,936
BALL TURNING DEVICE
Filed May 14, 1924
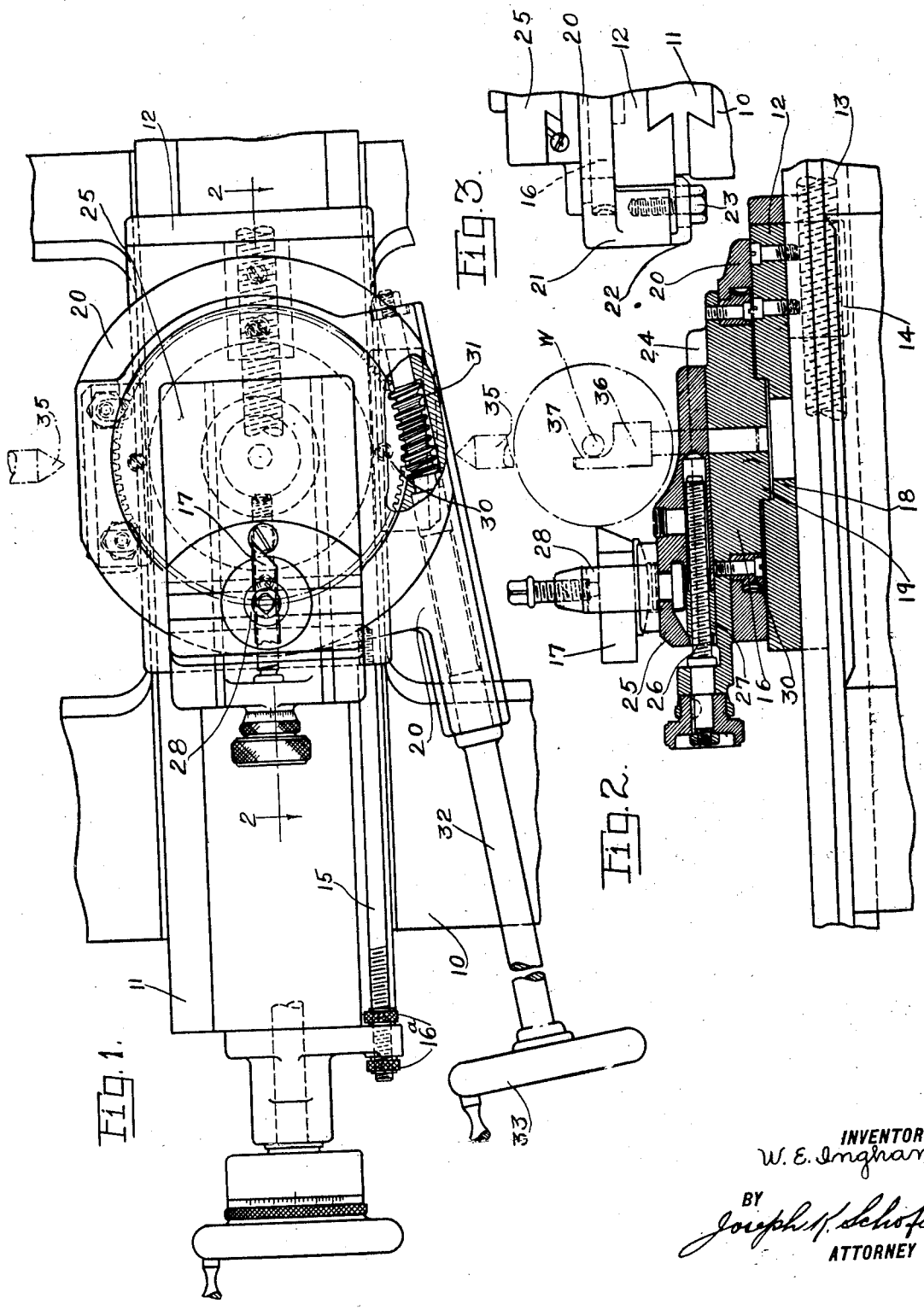
INVENTOR
W. E. Ingham.
BY
Joseph N. Schofield
ATTORNEY Patented May 3, 1927.

1,626,936

UNITED STATES PATENT OFFICE.

WALTER E. INGHAM, OF NEWINGTON, CONNECTICUT, ASSIGNOR TO PRATT & WHITNEY COMPANY, OF NEW YORK, N. Y., A CORPORATION OF NEW JERSEY.

BALL-TURNING DEVICE.

Application filed May 14, 1924. Serial No. 713,263.

This invention relates to a device for turning balls and in particular to a device which may be mounted directly on the cross slide of a lathe to turn a ball or portion of a sphere upon work mounted on the spindle of the lathe.

One feature which enables me to accomplish the above named object is that I mount a rotatable member upon the cross slide of the lathe and adjustably mount the tool vertically above this rotatable member so that it may be rotated about an axis normal to and intersecting the axis of rotation of the work.

Another feature which is advantageous is that the rotatable member carrying the tool may be accurately located by means of a gage so that balls may be turned to a high precision.

Another object of the invention is to apply the ball-turning rest to the upper surface of the cross slide so that it may be readily substituted for the usual compound rest.

It is a further object of the invention to provide conveniently located manual means for rotating the member on which the tool is mounted, these means preferably being operated by means of a worm and worm wheel.

With these and other objects in view, my invention consists in the features of construction and operation set forth in the following specification and illustrated in the accompanying drawing.

In the accompanying drawing annexed hereto and forming a part of this specification, I have shown my invention embodied in an attachment for an engine lathe but it will be understood that the invention can be otherwise embodied and that the drawing is not to be construed as defining or limiting the scope of the invention, the claims appended to this specification being relied upon for that purpose.

In the drawing:

Figure 1 is a plan view of the complete device, a part being broken away to more clearly show the construction.

Fig. 2 is a central sectional view in elevation taken substantially upon line 2—2 of Fig. 1.

Fig. 3 is a detail showing the method of attachment of the device to the lathe cross slide.

In the above mentioned drawing, I have shown but one embodiment of the invention which is now deemed preferable but it is to be understood that changes and modifications may be made within the scope of the appended claims without departing from the spirit of the invention.

Briefly, and in its broadest aspect, my invention comprises the following principal parts: a supporting member which, in the present instance, comprises the cross slide of a lathe; a rotatable member mounted thereon and provided with a retaining ring, this ring being provided with members adapted to engage the cross slide to support the rotatable member in position thereon; a slide mounted on the rotatable member and carrying a cutting tool thereon; a worm wheel formed on the rotatable member and adapted to engage a worm suitably supported in the retaining ring so that rotation of this worm by means of a hand wheel will cause the tool to be moved about in the arc of a circle. Further, the invention comprises a gage to accurately locate the ball turning device relative to the work supporting and rotating means on the lathe. This is for the purpose of enabling balls to be turned of uniform diameter.

Referring more in detail to the figures of the drawing, I show the carriage 10 of a lathe having a taper carriage slide 11 thereon. This slide 11 is normally retained against movement on the carriage 10 by any appropriate means. On its upper surface is mounted the cross slide 12 engaging the dove-tail projection on the taper carriage slide 11. This cross slide 12, in the usual operation of the lathe, is movable toward and from the axis of the work being turned by means of a screw 13 and nut 14, the screw 13 extending along the taper carriage slide 11 and engaging the nut 14 secured to this slide 12. In connection with the present invention, however, the cross slide 12 is used only to position the device accurately for ball turning and, when so located may be maintained in adjusted position by the threaded rod 15 and nuts 16ª shown in Fig. 1. These nuts 16ª engage opposite sides of a projection formed on the taper slide 11.

Mounted on this cross slide 12 is a rotatable member 16 on which is supported the tool 17 for turning the ball. Conveniently, the cross slide 12 is provided with a central recess 18 engaging a circular projection 19 formed on the lower surface of the rotatable member 16. To maintain the rotatable member 16 in its position on this cross slide 12, a retaining ring 20 is provided with projections 21 extending over the opposite edges of the cross slide 12 and is clamped thereto by means of the lugs 22 and screws 23 shown in Fig. 3. On the upper surface of the rotatable member 16 are dove-tail ways 24 adapted to be engaged by a corresponding recess formed in a tool supporting slide 25. This tool supporting slide 25 is adjustable along the ways 24 of the rotatable member 16 by means of a screw 26 and nut 27, the screw 26 being rotatable within an orifice provided in an extension of the rotatable member 16 and engaging the nut 27 inserted in the tool supporting rest or slide 25. On the upper surface of this tool rest 25 is a T-slot by means of which a tool post 28 of standard construction may be mounted for carrying the cutting tool 17.

In order to rotate the rotatable member 16, a worm wheel 30 is secured to the lower portions of this member, the one shown being in the form of a ring held in position on the rotatable member by suitable screws. In engagement with this worm wheel 30 is a worm 31 mounted upon a forwardly extending shaft 32 having a hand wheel 33 at its forward end. This shaft 32 is rotatably mounted in bearings formed on projections integral with the retaining ring 20. By rotation of the hand wheel 33 with the tool 17 properly adjusted, it may be swung about its axis in the arc of a circle of any diameter.

It will be obvious that the center about which the tool 17 is to be swung or rotated must be directly below the axis of the work being turned, that is, the axis of rotation of the tool 17 must intersect the axis of rotation of the work. The position of the axis of the work is indicated by the centers 35 shown in Fig. 1. For this purpose, I provide a gage 36 for properly locating the cross slide 12 to position the rotatable member 16 so that its axis of rotation will exactly intersect the axis of rotation of work mounted in the lathe. The rotatable member 16 is provided with a hole extending vertically and axially of the device. This forms a means for mounting the gage member 36 shown in dotted lines in Fig. 2. With the tool supporting cross slide 25 retracted, this gage 36 is inserted in this axial hole so that its upper flattened or cut-away surface 37 may engage work W of a predetermined diameter inserted upon the work supporting centers 35 of the lathe. With this gage member 36 with its flattened surface positioned at a predetermined distance from the axis of its shank and with a cylindrical bar W of predetermined diameter mounted on the lathe centers, the axis of rotation of the rotatable member 16 will be properly located for turning balls which will be spherical to a high degree of precision.

It will be seen from the above that the ball turning device may be substituted directly for the compound rest of a lathe without any modification of its construction. Further, it can be located to a high precision by the gage members 36 and W provided. With the device so located, balls of any diameter may be turned by slowly rotating the rotatable member 16 by means of the hand wheel 33.

What I claim is:

1. A ball turning rest for lathes comprising in combination, a cross slide, a supporting plate adjustably secured thereto, a rotatable member retained in said supporting plate, a cutting tool adjustably mounted on said rotatable member, and means inserted in the axis of the rotatable member to position said rotatable member whereby its axis of rotation will intersect the axis of rotation of work being turned in said lathe.

2. A ball turning rest for lathes comprising in combination, a cross slide, a supporting plate adjustably secured thereto, a rotatable member retained in said supporting plate, a cutting tool adjustably mounted on said rotatable plate, a member inserted in said rotatable member, a member inserted in the axis of rotation of said rotatable plate and adapted to engage a member mounted for rotation in said lathe, whereby the axis of rotation of said rotatable member will intersect the axis of rotation of work being in said lathe.

3. A ball turning rest for lathes comprising in combination, a cross slide, a supporting plate adjustably secured thereto, a rotatable member retained in said supporting plate, a cutting tool adjustably mounted on said rotatable plate, a member inserted in said rotatable plate, a member inserted in the axis of rotation of said rotatable plate having a plane surface thereon at a predetermined distance from said axis and adapted to engage a cylindrical member of predetermined diameter mounted for rotation in said lathe, whereby the axis of rotation of said rotatable member will intersect the axis of rotation of work being in said lathe.

In testimony whereof, I hereto affix my signature.

WALTER E. INGHAM.